United States Patent [19]

Trzoska

[11] 4,023,657
[45] May 17, 1977

[54] DEVICE FOR DAMPING A PERPENDICULARLY OSCILLATING MASS

[75] Inventor: Peter Trzoska, Bodenheim, Germany

[73] Assignee: Feinmechanische Werke Mainz GmbH, Mainz, Germany

[22] Filed: Jan. 14, 1976

[21] Appl. No.: 649,027

[30] Foreign Application Priority Data

Jan. 23, 1975   Germany .......................... 2502627

[52] U.S. Cl. ............................... 188/283; 188/1 B; 188/272

[51] Int. Cl.² ......................................... F16F 9/348

[58] Field of Search ........... 188/1 B, 1 R, 272, 302, 188/321, 279–283

[56] References Cited

UNITED STATES PATENTS

| | | | |
|---|---|---|---|
| 1,522,243 | 1/1925 | Hughes | 188/283 |
| 2,937,865 | 5/1960 | Patterson | 188/1 B UX |
| 2,966,124 | 12/1960 | Casey | 188/1 B X |
| 3,091,307 | 5/1963 | Tiedemann et al. | 188/1 B |
| 3,638,885 | 2/1972 | Reed | 188/283 X |
| 3,701,499 | 10/1972 | Schubert et al. | 188/1 B X |

*Primary Examiner*—Duane A. Reger

*Attorney, Agent, or Firm*—Webb, Burden, Robinson & Webb

[57] ABSTRACT

A device for damping a perpendicularly oscillating primary mass comprising a perpendicularly oscillatory reference mass supported by a piston in a pressure fluid chamber of an adjusting member. The pressure in the fluid chamber compensates for the weight of the reference mass and varies as a result of reference mass oscillation. Upon reduction of the prevailing pressure the fluid chamber receives fluid from a first pressure line through an automatic inlet valve, and upon increase of the prevailing pressure the fluid chamber emits fluid into a first return line through an automatic outlet valve, so as to impose on the adjusting member an oscillatory movement tending to reduce the vertical movement of the primary mass. The adjusting member forms a second piston in a follow-up cylinder to which the primary oscillating mass is connected. A third piston defining the closure element of a shuttle valve also in the follow-up cylinder and connected to the first piston, serves to select the supply of pressure fluid to and release of said fluid from the follow-up cylinder respectively through a second pressure line and a second return line.

3 Claims, 3 Drawing Figures

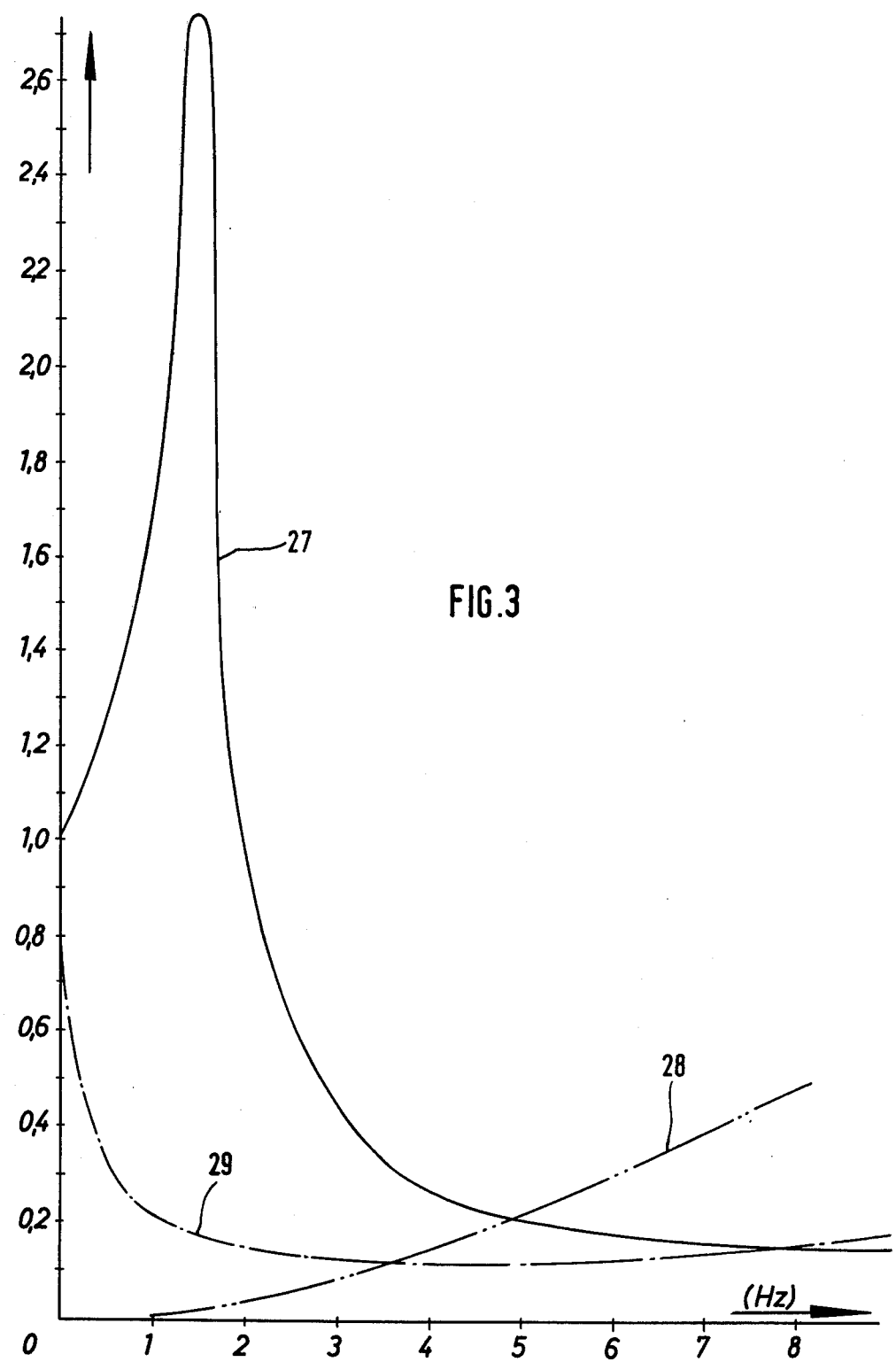

DEVICE FOR DAMPING A PERPENDICULARLY OSCILLATING MASS

This invention concerns a device for damping a vertically oscillating mass such as a motor vehicle seat, cabin or the like.

A passive damping for oscillation insulation and shock absorption is well known. In this connection, combinations of resilient and damping elements convert shock and oscillation energy into potential energy or, by liquid friction, into heat energy. Such passive dampers offer a good oscillation protection at frequencies of excitation which are sufficiently greater than the inherent frequency of the passive damper. However, at frequencies in the region of or less than their inherent frequency, passive dampers offer no oscillation protection, but increase the amplitude of the exciting oscillation. These disadvantageous transmission properties of passive dampers, at frequencies below and in the vicinity of their inherent frequency, are particularly aggravating for the human body, since in the range of low frequencies from about 1.5 to 7 Hertz the human body possesses pronounced resonance points. Main resonances arise through the spinal column and the body mass or resonances of individual organs which are resiliently suspended within the body. A severe oscillation stressing of the human in this frequency range impairs the well-being and can lead to damage to health. The aforesaid passive dampers have, in addition to this, the disadvantage that the spacing of the sprung mass relative to a supporting platform is load-dependent, so that from this, upon change of the load, other unfavourable geometrical ratios emerge. For example, a particularly heavy person will, with the same passive damping system, sink deeper in the driver's seat, which might adversely affect the driver's field of view.

Developments and experiments are known in which considerably stronger attenuations of resonance oscillations are achieved with active dampers. These dampers use electro-hydraulic servo valves, cylinders, return members and oscillation sensors. An electronic acceleration sensor detects the acceleration of the mass to be damped and gives via an amplifier, a corresponding signal to a servo valve, which regulates an oil flow to an adjusting member so that the mass is deflected contrary to the movement of its supporting platform so as to remain at substantially the same level, despite the oscillation of the platform. In order to avoid migration of the mass away from its design position through differing pressure impingments, occurring in operation, of the adjusting member and different opening times of the valves, an electronic displacement sensor detects the instantaneous position of the mass. This signal controls the servo valve to produce a second oil flow, fed to the adjusting member, which is regulated in such a way that the mass is returned towards a position which is central of the oscillation amplitude. The tooling expenditure of these electro-hydraulic active dampers is great. Their complicated construction and their use of electronic acceleration sensors, amplifiers, servo valves, electronic displacement sensors, lacks the necessary robustness, in other words they are susceptible to trouble in operational conditions and are expensive.

An object of the present invention is to provide an active damping device which works in accordance with a simpler mechanical-hydraulic principle so as to avoid the above-mentioned disadvantages of known dampers.

With this object in view, a device is provided according to this invention for damping a perpendicularly oscillating primary mass such as a motor vehicle seat, cabin, or the like. A vertically oscillatory constant reference mass is supported by a first piston in a first pressure fluid chamber of an adjusting member. The pressure fluid chamber is designed as a cylinder in which prevails pressure necessary for compensation of the weight of the reference mass upon reduction of the prevailing pressure in the first pressure fluid chamber as a result of reference mass oscillation, fluid is introduced from a first pressure line via an automatic inlet valve to the first fluid chamber through a passage the cross-section of which is proportional to the pressure drop. Conversely upon increase of its prevailing pressure in the first pressure chamber, fluid is passed into a first return line via an automatic outlet valve through a passage the cross-section of which is proportional to the pressure rise. The fluid passed to and from the first pressure fluid chamber imparts on oscillatory motion on the first piston. An, adjusting member being displaceable comprising a second piston and a follow-up cylinder on which acts the primary oscillating mass is damped in response to the motion of the first piston as follows: a third piston, which is designed as a slider or closure element of a shuttle valve is connected to the first piston. The slider upon oscillation of the reference mass opposed to oscillation of the primary mass, serves to select the supply of pressure fluid to and release of said fluid from the follow-up cylinder of the adjusting member by alternate connection thereto of a second pressure line and a second return line in such a way that the primary mass to be damped tends to balance with the damped reference mass. In other words, for a given movement of an oscillatory base, the movement of the reference mass relative to the base produces a corresponding movement of the primary mass in a manner to reduce the overall vertical movement of the primary mass.

Preferably the first piston is designed as a slider or closure element of a shuttle valve which serves to control opening and closing of a restricted inlet passage communicating directly between the first pressure line and the first pressure fluid chamber, and opening and closing of a restricted outlet passage communicating directly between the first pressure fluid chamber and the first return line, said slider tending to assume a central position in which said inlet passage and said outlet passage are both closed.

Advantageously the reference mass acts via a lever arm on the first piston and the primary mass to be damped acts via a parallelogram linkage on the follow-up cylinder.

The invention will be described further, by way of example, with reference to the accompanying drawings, in which:

FIG. 3 shows a diagram in which the amplitude ratio of the sprung to the unsprung masses is shown as a function of the exciting frequency, in respect of three types of damping.

The mechanical-hydraulic damping system comprises a combination of a mechanical acceleration sensor, a valve controlled by the mechanical acceleration sensor, and a hydraulic adjusting member incorporating a pressure responsive to said valve. Hydraulic fluid is controlled by the valve. It controls, by virtue of the sensed accelerations, an oil flow into a pressure fluid chamber of the adjusting member defined by a piston and follow-up a cylinder so that the oscillation amplitudes of the reference mass, which is connected to a piston of the adjusting member, are extensively reduced. An exciting movement, say upward thrust of a vehicle chassis resulting from a bump in the road, causes a corresponding relative movement between the primary mass, say seat and occupant, and the chassis which moves the seat opposite the exciting movement. This arrangement is sufficient to stabilise a constant mass. However, in order to be able to damp differing body weight, in other words variable masses, and to keep on a constant level, the mechanicalhydraulic adjusting mechanism a mechanism, hereinafter called the "follow-up amplifier". It offers in addition the advantage of a certain independence from the pump pressure. The follow-up amplifier consists of a cylinder and a control valve. The cylinder housing is at the same time designed as a valve slide or sleeve and is connected to the primary mass, say the driver's seat by a parallelogram linkage. The valve slide of the follow-up amplifier is slidably connected to the piston. The piston and is also coupled frictionally to the reference mass.

The use of the follow-up amplifier between the constant reference mass and the variable mass which is to be damped is necessary for the following reason. Force exertion from the sprung mass to the unsprung mass (for example, through actuation of operating levers) has, in the case of this principle of the active damper, the same effect as a stressing by acceleration forces. Therefore a detection of the acceleration forces by a constant reference mass is necessary.

Figure 1:
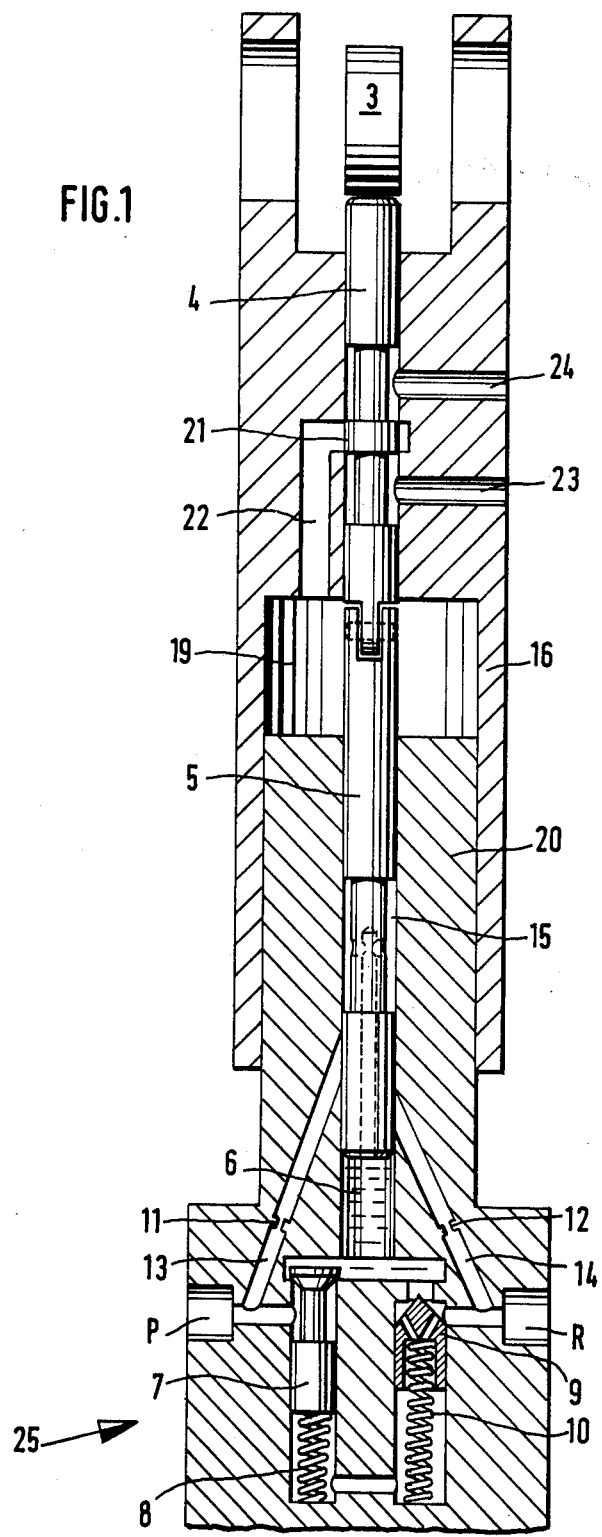
FIG. 1 shows the active damper with follow-up amplifier in longitudinal section.
Figure 2:
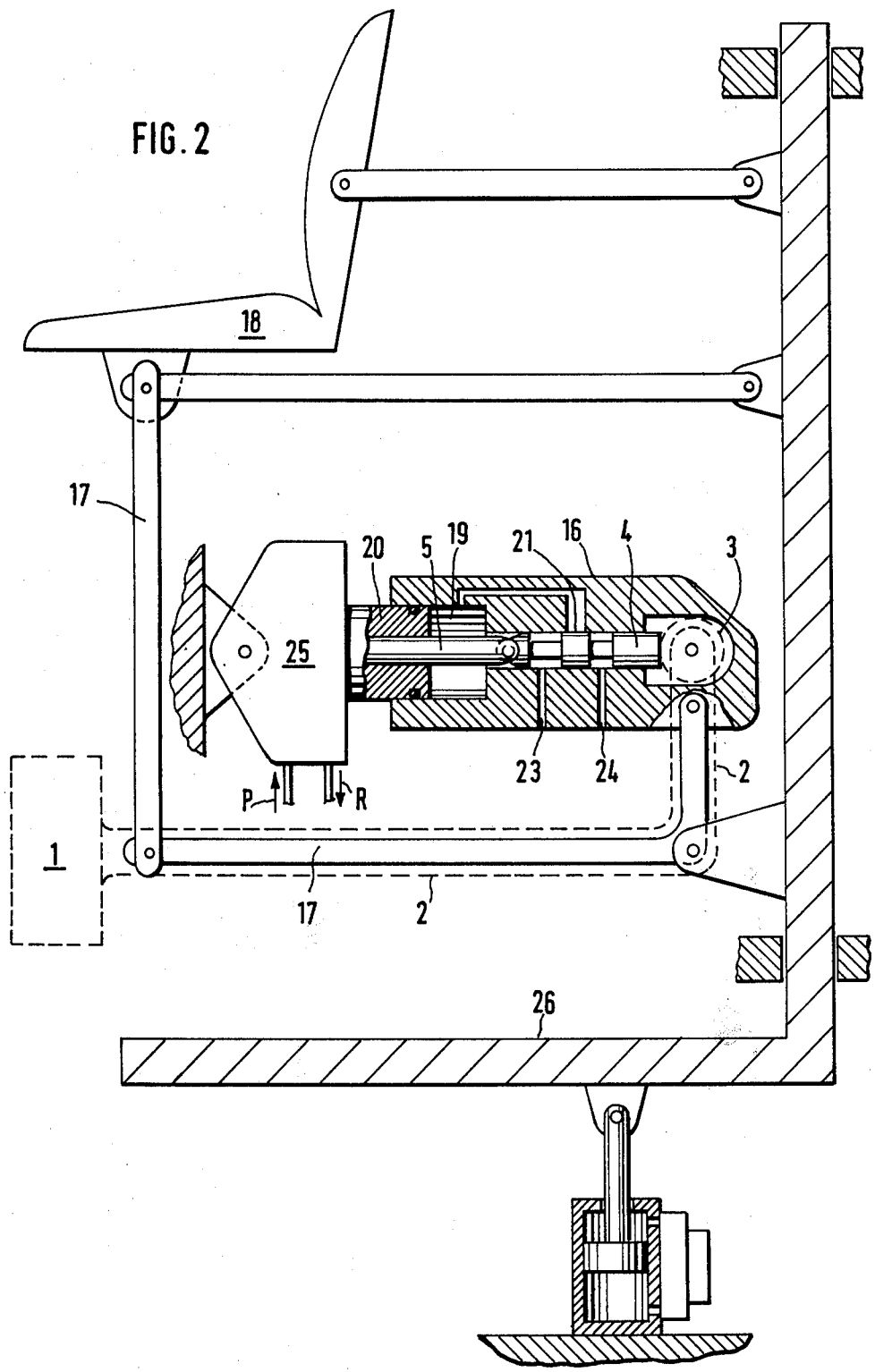
FIG. 2 shows an installation example in the form of a driver's seat built onto a vibrating platform.

As is shown in detail in FIGS. 1 and 2, a reference mass 1 is supported by a lever arm 2 at its force attack 3 directly against a third piston 4 and thereby against a first piston 5 positioned in a first pressure fluid chamber 6 and produces here a pressure corresponding to its own weight.

An automatic pressure-sensitive inlet valve 7 connects in the opened state the fluid chamber 6 with a pressure line P of a hydraulic system. The compressive force acting on the front surface of the inlet valve 7 is compared with the spring force of an adjusting spring 8. A pressure drop from the prevailing pressure in chamber 6 necessary for compensation of the inherent weight of the reference mass 1, and due to its oscillation, acts in such a way that the valve 7 opens to provide a passage whose cross-section is proportional to the pressure drop, for the supply of fluid pressure to the fluid chamber 6.

An automatic pressure-sensitive outlet valve 9 connects the first pressure fluid chamber 6 to a return line R of the hydraulic system. The compressive force acting on the front surface of the outlet valve 9 is compared with the spring force of the adjusting spring 10. The adjusting spring 10 is set in such a way that a rise in the prevailing pressure in chamber 6, above the pressure necessary for compensation of the inherent weight of the reference mass 1, due to oscillation of the mass 1, opens the valve 9 to provide a passage whose cross-section is proportional to the pressure rise. When valve 9 opens pressure fluid from chamber 6 flows to the return line R.

The opening points of the inlet and outlet valves are respectively slightly below and slightly above the prevailing pressure necessary for compensation of the weight of reference mass 1 Hence, the result is achieved that fairly small pressure changes, i.e. changes in the force due to inertia of the mass 1, are not taken into consideration, so that the switching frequency and hence the wear of the valves is reduced. Because of the slightly lower opening pressure of the inlet valve 7, reduction of the effective weight of the reference mass 1, brought about by small upward movements thereof, and the consequential lowering of the pressure in the chamber 6, does not lead to undesired opening of the inlet valve 7.

The piston 5 is, as shown in FIG. 1, designed as a slider or closure element of a shuttle valve which, in its central position shown, closes ports, leading via throttles 11 or 12 respectively, to a direct inlet passage 13 and a direct outlet passage 14 respectively. Deflections of the piston 5 upwards or downwards respective lead to the connection of the chamber 6 to the outlet passage 14, or of a chamber 15, communicating via a bore in the piston 5 with the chamber 6, to the inlet passage 13.

The primary mass 18 to be damped is supported by a parallelogram linkage 17 on a follow-up cylinder 16 having a chamber 19 in which there is produced a pressure necessary for compensation of the weight of the primary mass 18 to be damped.

Follow up cylinder 16 and slider 4 (also referred to herein as the third piston) of the follow-up amplifier, and the piston 5 of the active damper are arranged coaxially. The cylinder 20 containing the piston 5 also serves as a piston within the follow-up cylinder 16. The slider 4 of the follow-up amplifier is arranged between force attack point 3 of the reference mass and the piston 5. Piston 5 and slider 4 are of the same diameter. The pressure prevailing in the chamber 19 is considerably less than that in the chamber 6 of the active damper, so that a force from the pressure in the chamber 19 is precluded.

In the case of a deviation from the central position shown in FIG. 1, between the unit of slider 4 and the follow-up cylinder 16 upwards or downwards, control cross-section or port 21 of the chamber 19 is connected through a connection line 22 to a second pressure line 23 or to a second return line 24 respectively so that the acting compressive force or the effective weight of the primary mass 18 to be damped allows the cylinder 16 to follow the unit of slider 4 and piston 5 and keeps the mass 18 on the same level.

Upon travelling over an uneven ground surface, any unsprung mass experiences an acceleration upwards or downwards. The reference mass 1, shock-insulated by the described active damper, on the other hand experiences only a slight acceleration, which, by virtue of the above described pressure-sensitive valves 7 and 9, is necessary in order to open the inlet valve 7 or the outlet valve 9 respectively, to form a passage of adequate cross-section. As a result of the ensuing pressure gradient — pressure in the chamber 6 against return pressure, or supply pressure against pressure in the chamber 6 — through the open cross-section of the outlet valve 9 or the inlet valve 7, a pressure medium flow from or to the adjusting member causes the adjusting member velocity to correspond approximately to the opposed exciter velocity. The velocity of the reference mass 1 and the adjusting member velocity corresponds thus to the exciter velocity. The same applies to the accelerations.

FIG. 3 shows a diagram in which the amplitude ratio of the sprung mass 18 to the unsprung mass is represented as a function of the exciter frequency for different damping systems. For the active damper, coupled with a follow-up amplifier of the described kind, there emerges for small frequencies the favourable characteristic line 29. At higher frequencies this characteristic line rises again to greater amplitudes, since with rising frequency an increasing phase shift between damping piston travel and follow-up cylinder travel occurs. In the important frequency range between 1 and 7 Hertz, in which the human body possesses pronounced resonance points, there emerges, however, in the case of this damping system an optimum zone.

The characteristic line 27 shows the effect upon lighter passive damping. The characteristic line 28 characterises an electro-hydraulic active damping system.

I claim:

1. A device arranged to be connected to a hydraulic pump and reservoir for damping a primary mass vertically oscillating relative to a base comprising:
   a vertically oscillatory constant reference mass,
   a first piston and a first cylinder means together defining a first pressure fluid chamber, said first piston supporting said reference mass such that the pressure in said first pressure fluid chamber is responsive to the acceleration of said reference mass,
   a hydraulic means for moving the primary mass vertically relative to the base comprising a second piston and follow-up cylinder one of which is connected to the primary mass and the other of which is connected to the base, said second piston or follow-up cylinder together defining a second pressure chamber,
   a first pressure line connecting said first pressure fluid chamber via an automatic inlet valve to said pump and a first return line connecting said first pressure fluid chamber via an automatic outlet valve to said reservoir, said automatic inlet and outlet valves comprising means responsive to the pressure in the first pressure fluid chamber for directing fluid into or out of the chamber at a rate related to said pressure and to move the first piston relative to the first cylinder,
   a second pressure line connected to said pump and a second return line connected to said reservoir,
   a third piston defining the closure element of a shuttle valve which is selective of said second pressure line and second return line for directing fluid into or out of the second pressure chamber to move the second piston and follow-up cylinder relative to each other,
   means connecting the first piston and the third piston,
   such that upon vertical acceleration of the base the inertial force upon the reference mass is translated into motion of the first and third pistons thereby adjusting the volume of the second pressure chamber to change the relationship between the base and the primary mass in a way to reduce vertical movement of the primary mass.

2. A device according to claim 1, wherein the first piston is designed as a shuttle valve closure element which serves to control opening and closing of a restricted inlet passage communicating directly between the first pressure line and the pressure fluid chamber and opening and closing of a restricted outlet passage communicating directly between the first pressure fluid chamber and the first return line, said first piston tending to assume a central position in which said inlet passage and said outlet passage are both closed.

3. A device according to claim 1, wherein the reference mass acts via a lever arm on the first piston and the primary mass to be damped acts via a parallelogram linkage on the follow-up cylinder.

* * * * *

UNITED STATES PATENT AND TRADEMARK OFFICE
CERTIFICATE OF CORRECTION

PATENT NO. : 4,023,657
DATED : May 17, 1977
INVENTOR(S) : Peter R. Trzoska

It is certified that error appears in the above-identified patent and that said Letters Patent are hereby corrected as shown below:

On the first page of the document - the inventor's middle initial --R.-- should be indicated.

Column 2 Line 2 "perpendicularly" should read --vertically--.
Column 2 Last line - Column 3 Line 1 - Delete --incorporating a pressure--.
Column 3 Line 16 "mechanicalhydraulic" should read --mechanical-hydraulic--.
Column 3 Line 17 After "mechanism" (first occurrence) insert --is--.
Column 3 Line 26 Delete --and--.
Column 4 Line 2 After "1" insert a period --.--.

Signed and Sealed this sixteenth Day of August 1977

[SEAL]

Attest:

RUTH C. MASON
Attesting Officer

C. MARSHALL DANN
Commissioner of Patents and Trademarks